Patented May 11, 1943

2,319,076

UNITED STATES PATENT OFFICE 2,319,076

HOT NECK GREASE

Lester W. McLennan, Richmond, and Oliver W. Neukom, Berkeley, Calif., assignors to Union Oil Company of California, Los Angeles, Calif., a corporation of California No Drawing. Application October 24, 1939, Serial No. 300,978

12 Claims. (Cl. 252—21)

This invention relates to lubricating greases for the lubrication of heavy duty bearings operating at high temperatures in steel rolling mills.

In rolling mills and plants operating under similar heavy duty conditions, the hot roll bearings are subjected to such high temperatures and extreme loads that lubricants to be employed therewith must offer a high degree of temperature resistance and must at the same time be capable of withstanding high bearing pressures if such greases are to be satisfactory. Also such lubricants must possess high ignition points well above the operating temperatures encountered, and should not lose appreciable proportions of oil during use. It is desirable further that such a lubricant after use should be recoverable and capable of being mixed with new grease or oil or both.

The object of the present invention is to meet all of the requirements above indicated.

The lubricating grease of this invention comprises primarily lubricating oil, a heavy bituminous residuum having some lubricating properties, preferably a quantity of filler such as clay, and the saponification products of animal degras, that is a soap (preferably a calcium soap) together with the unsaponifiables of wool grease. This degras soap should be present in quantity sufficient to avoid syneresis or "sweating" of the oil. In general, at least 10% of a calcium degras soap is required together with the corresponding unsaponifiables. In addition to the degras soap, a quantity of tallow soap or other fatty acid soap, preferably approximating not more than the proportion of the degras soap (and sometimes possibly being entirely omitted), will also be employed.

In practicing the present invention we have a product using the following materials in the proportions of the first column and other products within the general range of the second column:

|  | Specific example | Range |
|---|---|---|
|  | Percent | Percent |
| Animal degras (wool fat) | About 16 | 10 to 25 |
| Prime tallow | About 10 | 8 to 15 |
| Clay | About 20 | 5 to 25 |
| Bituminous residuum | About 20 | 50 to 5 |
| Hydrated lime | About 6 | 4 to 8 |
| Lubricating oil (balance) | About 28 | 15 to 50 |

The resultant product from the specific example contained the following:

| | Per cent, about |
|---|---|
| Calcium degras soap | 11 |
| Calcium tallow soap | 11 |
| Free calcium hydroxide | 2 |
| Water | 0.5 |
| Unsaponifiables from the degras and tallow, including glycerin | 7.5 |
| Clay | 20 |
| Asphaltic residuum | 20 |
| Lubricating oil (balance) | 28 |

In making the above composition we prepared, for example, a 4,000 pound batch by means of the following procedure. As a convenient means of providing the clay and part of the oil, we found it desirable, as well as convenient, to use a spent clay which had been previously employed in decolorizing a high flash point lubricating oil. In the example given below the 1500 pounds of spent clay was in fact composed of nearly 50% (about 47.5%) of lubricating oil. However, in other instances, we have also used fresh decolorizing clay, and in still other instances we could use other inert materials such as fuller's earth and chalk and other non-abrasive fillers. The materials employed were in the following quantities:

|  | Pounds | Percent |
|---|---|---|
| Wool fat (degras) | 635 | 15.9 |
| Prime tallow | 403 | 10.1 |
| Calcium hydroxide (hydrated lime) | 235 | 5.9 |
| Lubricating oil | 422 | 10.5 |
| Spent clay (37.5%) containing oil | 1500 | Oil 17.5 / Clay 20.0 |
| Asphaltic residue | 805 | 20.1 |
|  | 4000 | 100.0 |

In employing these materials, a conventional type of grease kettle capable of being heated by steam to approximately 350° F. and containing an adequate mechanical agitator, was first charged with the animal degras, the prime tallow and the 422 pounds of lubricating oil. This oil was a lubricating distillate possessing a viscosity of 125 seconds Saybolt Universal at 210° F., and a Cleveland open cup flash point of 515° F. This charge of degras, tallow and oil was heated until liquefied and then thoroughly mixed by mechanical agitation. While continuing the agitation, the hydrated lime was slowly added. Steam was then admitted to the jacket of the kettle and the batch heated for approximately three hours to as high a temperature without foaming. This averaged a little higher than 300° F. After three hours saponification was complete, and at that time the 1500 pounds of spent clay was added. This clay had previously been used in decolorizing a high flash point lubricating oil, having a viscosity of 64 seconds Saybolt Universal at 210° F. and a flash point of 470° F. by the C. O. C. method. This spent clay amounted to 37.5% of the mixture but since nearly half of it was oil, the clay itself amounted to only about 20% of the total batch and the remainder (about 17.5% of the total batch) was oil. After the spent clay was thoroughly incorporated in the soap-oil mixture, the asphaltic residue was added and well mixed at a temperature of approximately 310° F. This residue was a liquid petroleum residue containing about 95% of 80-penetration asphalt as determined by A. S. T. M. method D243-36, "Residue of Specified Penetration," said liquid petroleum residue possessing a flash point of 450° F. as determined in the Pensky-Martens closed cup flash tester. The product was drawn at a temperature of about 310° F. and cooled.

The product produced by the above method had an A. S. T. M. penetration of 29 at 77° F., and a Ubbelohde melting point of 275° F.

While the foregoing product illustrates a preferred embodiment of the invention, the invention nevertheless is not limited to the specific percentage of materials given, nor necessarily for all purposes is it limited to the specific materials stated. We have, however, found that an important element of the invention is the employment in the grease of the saponification products of the animal degras including the unsaponifiables. It appears that at least about half of the soap present must be degras soap in order to avoid syneresis, such separation of oil being always of objectionable in grease. Where prime tallow soap is used with degras soap, it appears that the tallow soap should never be much more than one-half of the total soap, and apparently more than 55% tallow soap is objectionable. On the other hand, the tallow soap may be reduced to a considerable extent, and at least for some uses may be completely replaced by the degras soap and the unsaponifiables and saponification products of the degras.

In the example given the total soap content approximates 22%, and the unsaponifiables and glycerin amount to about 7½% of which perhaps 5% are unsaponifiables from the degras. However, we are not limited to soap contents in the order of 20%. The total soap content may be as low as 15% or as high as 30%, of which all or only a portion, as above indicated, may be degras soap. Since an appreciable proportion of the degras is non-saponifiable, for example around 30%, or from 25% to 35%, the range of degras employed would be in the order of from 20% to 40% of the total composition if no other soap than degras soap is used. Again, since the tallow soap or similar soap is not to exceed about 55% of the total soap, and since the upper limit of total soap ordinarily would not exceed about 30% of the composition, the variation for the prime tallow would extend between 0% and about 15% based upon the total charge used.

With respect to the clay or kindred filler employed, this also may be varied within a fairly wide range. Since commercial demands usually limit the ash content to about 25%, a maximum practical percentage of clay might be set at about 25%; although so far as lubricating efficiency is concerned, a greater percentage, possibly as high as 40% or 50% clay might conceivably be employed. Since some filler is always desired in this type of product because it increases load-carrying capacity and raises melting point, a practical lower limit therefor probably would be around 5% to 10%. Possibly an entirely suitable product would not contain much less than 10%.

With respect to the hydrated lime to be employed, this will vary in part in accordance with the amount of soap stock used, and may also vary in part in accordance with the maximum alkalinity permitted in the final product. Thus, whereas about 2% of free alkalinity appeared in the product of the example, it might in some cases extend to 4% to 5%, although ordinarily 2% would represent a practical limit. Again, a neutral grease might be prepared, and where the soap limit is around the lower range of about 15%, the hydrated lime might be as low as about 3.5%. Thus, varying between a neutral grease at the lower limit of 15% soap where only degras is employed to a basic grease containing also tallow soap with a free lime content of 5%, the hydrated lime employed might vary between about 3% and about 10%.

With respect to the type of oil employed in the preparation of the grease, a fairly wide range of tolerance is possible. Apart from the fact that the oil used should be a residuum of some type, either blended or straight run, such as a lubricating type oil, the components of the oil appear to be relatively unimportant. Straight run distillates from crude oils of western or naphthenic type have been employed instead of the S. A. E. 50 lubricating oil of the example. A highly paraffinic type of oil obtained from certain western crudes has been used as part of the oil content, especially in the case of the oil contained in the spent clay as above described. The important feature of the oil is that it shall have an adequately low minimum flash point, for example 425° F. minimum. Preferably, it should be higher. As to the asphaltic type residuum, this may vary also and may contain larger or smaller percentages of asphalt than that of the example, such as 5% to 55% asphalt, and likewise may contain asphalts of higher or lower penetration than the 80 penetration of the example, for example within a range of 20 penetration to 200+ penetration.

In general, the function of the saphalt is to impart adhesiveness to the grease at the elevated operating temperatures as well as to improve the compatibility of fresh grease with used grease.

Considering the oil and asphaltic residuum together, these are all petroleum fractions. In the specific example above, they total about half the composition (48%), and in one sense they have similar functions in that they all impart lubricating properties to the grease. The asphaltic (bituminous) material may in itself vary, as between about 5% and 55%. The combined content of asphalt fractions and oil fractions may also vary, as between about 20% and 65%, according to the content of soap and filler, especially as considered in connection with possible variation in the oil as indicated below. However, variations in the proportion of asphaltic residuum or bituminous material ordinarily will be offset by changes in other constituents rather than by changes in lubricating oil, especially as higher asphalt ranges are approached.

Again, the asphalt and the clay may both be considered as hardening or bodying constituents apart from the effect of the soap. The function of the clay or other filler is to insure load-carrying capacity should the soap-thickened mineral oil content be insufficient for lubrication under high loads. The filler also raises the melting point, improves the temperature susceptibility of the product, aids the comatability of the grease, and causes the grease to possess a drier, less sticky texture at ordinary temperatures which facilitates handling.

As to the quantity of oil employed, while the example indicates the balance of oil amounted to about 28%, including that in the spent clay, the proportion of oil nevertheless may be varied according to the consistency of the product required. Thus, as the proportion of soap is increased, it may be desired to decrease the proportion of oil. For example, the total oil may be decreased to 20%. Again, if the asphaltic residue contains more oil or oily constituents and less asphalt, the effective amount of total oil would thereby be increased. Thus, the oil for various practical purposes probably can be varied between limits of 15% and 40%, or even 50%, depending upon the proportions of asphalt, clay or soap. The major requirement is that of melting point and consistency. In general, the melting point of the grease should be at least 200° F. and probably not appreciably above 325° F. The range of penetration should generally be between about 15 and 50 A. S. T. M. penetration at 77° F. These characteristics in the product can be modified by variation of oil, asphalt, clay or soap. Obviously, the soap characteristics will be modified by the nature of the metal employed (calcium being preferred), and by the nature of the soap stocks, as will be understood by those skilled in the art. Again, where it may be desired to substitute other forms of saponifiable or true waxes for the degras, it may be necessary to increase the percentage of the oil according as the selected wax tends to produce a harder soap and harder grease.

With respect to degras, it may be possible for some uses to use other natural animal or vegetable waxes containing saponifiable constituents, that is, waxes which may be referred to as either true waxes or saponifiable waxes. These will include beeswax, spermaceti, carnauba wax, montan wax, Japan wax and candelilla wax. It will be understood that these waxes, as well as degras, contain substantial quantities of esters and alcohols of the nature which constitute waxes. However, some of these waxes, for example carnauba wax, tend to produce hard soaps which produce hard greases. In such instances the quantities of asphalt and oil, and possibly the character of other soap employed, as well as the proportion of clay, will need to be modified to maintain the desired physical characteristics in the finished product. Taken with the teachings herein given, the necessary variations will be understood by those skilled in the art. As to substitutes for prime tallow as a soap stock, other fatty acids and fatty materials known to the grease manufacturer may be used. All such materials are intended to be included herein by means of the terms "fatty acids" or "fatty materials." This will include, for example, stearic acids, palmitic acids, oleic acids, and, possibly in some instances, cottonseed oils, corn oils, lard oil and the like according to circumstances.

Based upon the ranges of proportions above given, various compositions may, in general, require or permit variations within the limits of the following table:

| | Per cent |
|---|---|
| Total calcium soap | 15 to 30 |
| Calcium degras soap | 7 to 30 |
| Degras employed | 10 to 40 |
| Lubricating oil (including that in the clay and in asphalt) | 15 to 50 |
| Asphalt in residuum | 55 to 5 |
| Clay (oil-free basis) | 5 to 40 |
| Hydrated lime (quantity sufficient with or without excess) | 4 to 8 |

In selecting metals for the soaps, calcium is preferred, the medium being hydrated lime. Aside from calcium, it is otherwise preferred to use a metal yielding a soap which produces water-resistant greases, such as barium and aluminum. Otherwise, it may be possible for some purposes to employ sodium soaps or even magnesium soaps, or soaps of any other metals yielding greases of proper physical characteristics. The preferred class of soaps will be calcium and bariums soaps.

The disclosures given herein are for the purposes of illustrating the invention, and, therefore, are not to be considered as limiting beyond the scope of the appended claims and the prior art, inasmuch as many variations will be apparent to those skilled in the industry.

We claim:

1. A lubricating grease comprising mineral lubricating oil, between about 5% and 50% of an inert filler and between about 15% and 40% of the saponification products of saponfiable materials selected from the group consisting of animal and vegetable waxes of which at least about half of the soap is a soap of such wax.

2. A lubricating grease according to claim 1 containing in the order of 20% to 40% of lubricating oil and 15% to 25% of asphaltic residue.

3. A lubricating grease comprising mineral lubricating oil and bituminous residues, an appreciable quantity of an inert filler, and between about 15% and 40% of the saponification products of fatty materials and waxes, of which at least about half of the soap is wax soaps.

4. A lubricating grease according to claim 3 in which the soap is calcium soap.

5. A lubricating grease comprising between about 10% and about 50% of mineral lubricating oil, between about 10% and about 50% of asphalt, the oil and asphalt combined constituting at least about one-half of the composition, and between about 10% and about 40% of saponification products of degras.

6. A mineral lubricating grease comprising mineral lubricating oil and asphaltic residue approximating one-half of the composition and between about 15% and 40% of saponification products of fatty materials and of saponifiable waxes, said saponification products containing calcium soap of which the soap of said waxes approximates at least about half of the total soap.

7. A lubricating grease comprising between about 5% and 30% of asphaltic residue, between about 10% and 40% of mineral lubricating oil, between about 10% and 25% of inert non-abrasive earth filler, at least about 15% of the saponification products of wool fat and a quantity of other soaps of fatty acid materials not greatly exceeding the proportion of wool fat soaps.

8. A grease according to claim 7 wherein the soaps are soaps of metals producing water-resistant greases.

9. A grease according to claim 7 in which the soaps are calcium soaps.

10. A lubricating grease comprising approximately 20% of asphaltic residues, approximately 30% of lubricating oils, approximately 10% of soap or wool fat, prime tallow soap not greatly exceeding the quantity of wool fat soap, and the unsaponifiable constituents of the wool fat and prime tallow, the soap being soaps of metals yielding water-resistant greases.

11. A grease according to claim 10 in which the soaps are calcium soaps.

12. A lubricating grease according to claim 7 wherein the non-abrasive filler and part of the lubricating oil are in the form of a spent clay which has been used to decolorize lubricating oil, a large proportion of the spent clay-oil mixture being retained lubricating oil.

OLIVER W. NEUKOM.
LESTER W. McLENNAN.